(12) United States Patent
Song et al.

(10) Patent No.: US 12,190,481 B2
(45) Date of Patent: Jan. 7, 2025

(54) AGILEGAN-BASED STYLIZATION METHOD TO ENLARGE A STYLE REGION

(71) Applicant: Lemon Inc., Grand Cayman (KY)

(72) Inventors: Guoxian Song, Los Angeles, CA (US); Jing Liu, Los Angeles, CA (US); Weihong Zeng, Beijing (CN); Jingna Sun, Beijing (CN); Xu Wang, Beijing (CN); Linjie Luo, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 30 days.

(21) Appl. No.: 17/807,527

(22) Filed: Jun. 17, 2022

(65) Prior Publication Data

US 2023/0410267 A1 Dec. 21, 2023

(51) Int. Cl.
*G06T 5/50* (2006.01)
*G06T 3/4046* (2024.01)
*G06V 40/16* (2022.01)

(52) U.S. Cl.
CPC ............. *G06T 5/50* (2013.01); *G06T 3/4046* (2013.01); *G06V 40/168* (2022.01); *G06T 2207/20081* (2013.01); *G06T 2207/20084* (2013.01); *G06T 2207/20132* (2013.01); *G06T 2207/20221* (2013.01); *G06T 2207/30201* (2013.01)

(58) Field of Classification Search
None
See application file for complete search history.

(56) References Cited

U.S. PATENT DOCUMENTS

| 10,891,723 | B1 * | 1/2021 | Chung | G06T 5/001 |
| 2022/0122307 | A1 * | 4/2022 | Kalarot | G06F 18/211 |
| 2023/0086807 | A1 * | 3/2023 | Lukác | G06T 7/11 |
| | | | | 345/629 |

OTHER PUBLICATIONS

Li et al. et al. Machine translated Chinese app. Document ID CN 114170472 (Year: 2022).*

* cited by examiner

*Primary Examiner* — Saptarshi Mazumder
(74) *Attorney, Agent, or Firm* — Faegre Drinker Biddle & Reath LLP

(57) ABSTRACT

Methods and systems for enlarging a stylized region of an image are disclosed that include receiving an input image, generating, using a first generative adversarial network (GAN) generator, a first stylized image, based on the input image, normalizing the input image, generating, using a second generative adversarial network (GAN) generator, a second stylized image, based on the normalized input image, blending the first stylized image and the second stylized image to obtain a third stylized image, and providing the third stylized image as an output.

17 Claims, 5 Drawing Sheets

AGILEGAN-BASED STYLIZATION METHOD TO ENLARGE A STYLE REGION

BACKGROUND

Portraiture, the art of depicting the appearance of a subject, is an important art form dating back to the beginning of civilization. It has evolved beyond faithful depiction into more creative interpretations with a plethora of styles, such as abstract art, Cubism and cartoon. Automatically stylized portraiture has undergone rapid progress in recent years due to advances in deep learning. Early methods involving neural style have convincingly demonstrated the ability to transfer textural styles from an exemplar source to target images, with real photos transformed into Van Gogh or Picasso paintings. However, when it comes to portraiture, these methods largely failed to capture the important geometry-dependent motifs of different portraiture styles, thus falling short in stylization quality.

Image-to-image translation methods were later introduced to "translate" images from a source domain to a target domain using paired datasets in a supervised manner or using unpaired datasets in an unsupervised setting. These methods have been explored for portrait stylization, e.g., self-to-anime and cartoon. AgileGAN, a most recent state-of-art framework can generate high quality stylistic portraits via inversion-consistent transfer learning while providing greater agility when creating high-quality and high-resolution (1024×1024) portrait stylization models, require only a limited number of style exemplars (~100), and can be trained in a short amount of time (~1 hour).

However, with the AgileGAN-based portrait stylization workflows, a generated image is stylized in a region that is fixed and limited to a user's face. For example, when the user uploads an input image, systems need to crop and/or otherwise normalize the input image to generate a corresponding output image with a style region. Usually, the style region is relatively smaller than the original input image, and only covers part, if any, of a user's hair region and/or neck region. Accordingly, there exists a need for an AgileGAN-based stylization method to enlarge a style region of an image.

It is with respect to these and other general considerations that embodiments have been described. Although relatively specific problems have been discussed, the examples described herein should not be limited to solving the specific problems identified in the background above.

SUMMARY

In accordance with examples of the present disclosure, a refinement method for a GAN, and more specifically, an AgileGAN-based portrait stylization workflow, is described. In examples, after training a stylized generator using an AgileGAN method for example, a post-processing step may be included to enlarge a stylized region of an image. An advantage of the present disclosure may be to enlarge a stylized region of an image to include a hair region, neck region, headwear, or other accessories that may not otherwise be fully stylized.

In some examples a method for enlarging a style region of an image is disclosed. The method includes receiving an input image; generating, using a first generative adversarial network (GAN) generator, a first stylized image, based on the input image; normalizing the input image; generating, using a second generative adversarial network (GAN) generator, a second stylized image, based on the normalized input image; blending the first stylized image and the second stylized image to obtain a third stylized image; and providing the third stylized image as an output.

In some examples, the method further includes extracting a first face parse mask from the first stylized image, and extracting a second face parse mask from the second stylized image. The blending of the first stylized image and the second stylized image is based on the first and second face parse masks.

In some examples, the blending of the first stylized image and the second stylized image comprises gaussian blending.

In some examples, the third stylized image comprises a first set of pixels corresponding to hair and necks regions of the first stylized image, and a second set of pixels corresponding to the face region of the second stylized image.

In some examples, the normalizing comprises one or more of cropping or scaling the input image.

In some examples, the first GAN generator is different than the second GAN generator.

In some examples, the first GAN generator and the second GAN generator are AgileGAN generators.

In some examples, the method further includes receiving a plurality of exemplar stylistic images, and training the first and second GAN generators using transfer learning based on the received plurality of exemplar stylistic images.

In some examples, a system is disclosed. The system includes at least one processor and memory storing instructions that, when executed by the at least one processor, causes the system to perform a set of operations. The set of operations implement any of the methods described herein.

In some examples, a non-transient computer-readable storage medium is disclosed. The non-transient computer-readable storage medium includes instructions being executable by one or more processors to cause the one or more processors to implement any of the methods described herein.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
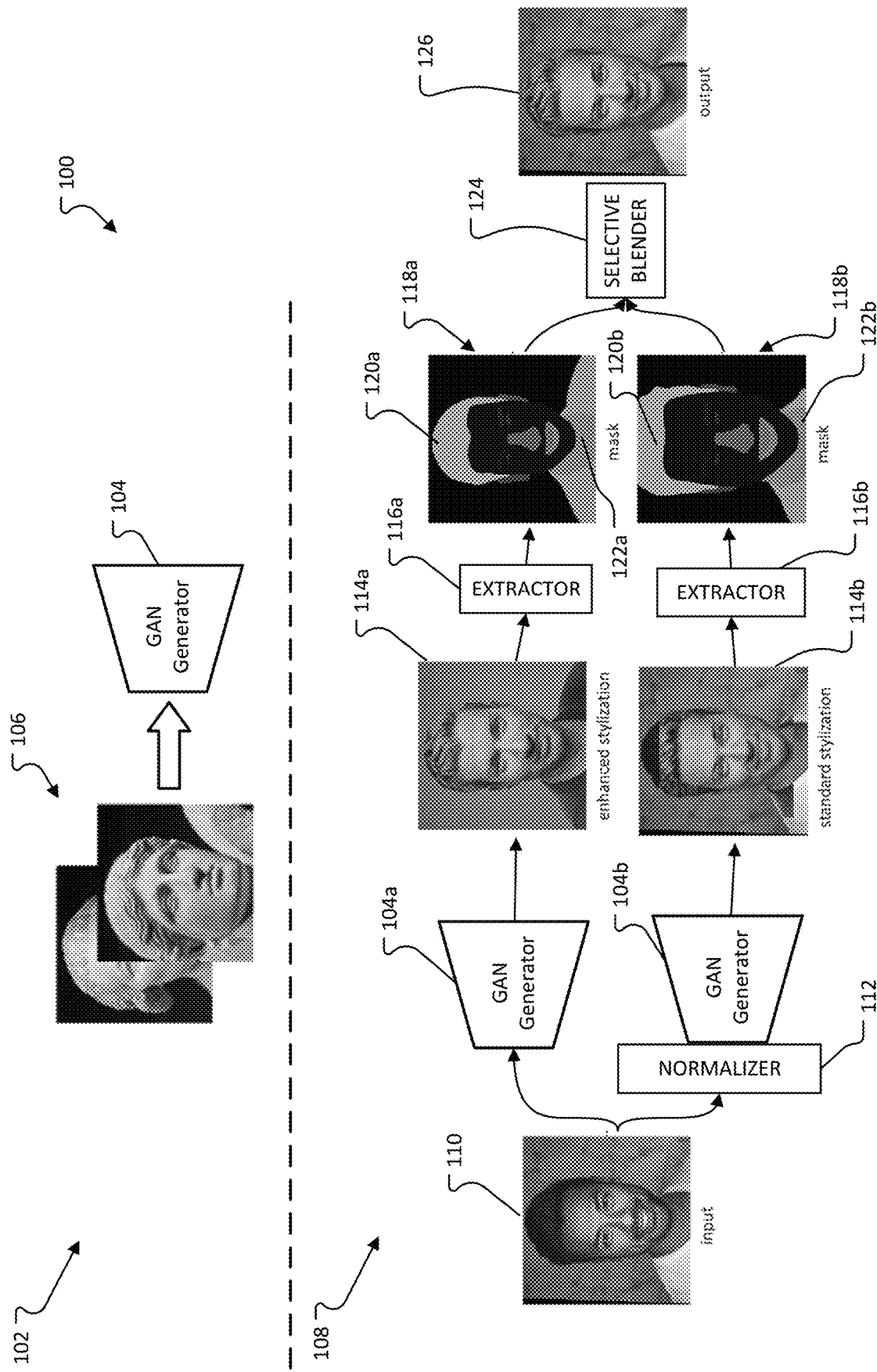
FIG. 1 illustrates an example of a dataflow process for enlarging a style region of an image in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Stylizing facial images in an artistic manner has been explored in the context of non-photorealistic rendering. Early approaches relied on low level histogram matching using linear filters. Neural style transfer, by matching feature statistics in convolutional layers, led to early exciting results via deep learning. Since then, several improvements directed to enforcing local patterns in deep feature space via a Markov random field (MRF) and extending style transfer to video and improved the quality by imposing temporal constraints have been proposed. Although these methods can achieve generally compelling results for several artistic styles, they usually fail on styles involving significant geometric deformation of facial features, such as cartoonization. For more general stylization, image-to-image (I2I) translation may be used to translate an input image from a source domain to a target domain.

Conditional generative adversarial networks (GAN) may be implemented to learn the input-to-output mapping. Similar ideas have been applied to various tasks, such as sketches-to-photographs and attribute-to-images. For example, the well-known cycle-consistency loss in CycleGAN has been proposed to improve network training stability for the unpaired setting. Unsupervised methods have also been used in cartoonization. Further, CycleGAN has been extended to cross-domain anime portrait generation, and other unsupervised methods have incorporated an attention module and a learnable normalization function for cartoon face generation, where their attention-guided model can flexibly control the amount of change in shape and texture. GANs have been used to synthesize images that ideally match the training dataset distribution via adversarial training. GANs have been applied to various areas, including but not limited to image inpainting, image manipulation, and texture synthesis. Various advancements have been made to improve the architecture, synthesis quality, and training stability of GANs.

Since GANs are typically designed to generate realistic images by sampling from a known distribution in latent space, GAN inversion addresses the complementary problem of finding the most accurate latent code, when given an input image, that will reconstruct that image. One approach is based on optimization, which is directly optimizing the latent code to minimize the pixel-wise reconstruction loss for a single input instance. Another approach is learning-based, in which a deterministic model is trained by minimizing the difference between the input and synthesized images. Other works combine these the optimization and learning-based approaches by learning an encoder that produces a good initialization for subsequent optimization. In addition to image reconstruction, some examples also use inversion when undertaking image manipulation. For example, a hybrid method may encode images into a semantic manipulable domain for image editing. In addition, a generic Pixel2Style2Pixel (PSP) encoder has been proposed; such an encoder is based on a dedicated identity loss for embedding images in several real image translation tasks, such as inpainting and super resolution.

As previously mentioned, when users uploads an input image, systems need to crop and/or otherwise normalize the input image to generate a corresponding output image with a style region. Usually, the style region is relatively smaller than the original input image, and only covers part, if any, of a user's hair region and/or neck region. Accordingly, there exists a need for an AgileGAN-based stylization method to enlarge a style region of an image to include the entire hair region, neck region, headwear, and/or other accessories, which may not otherwise be appropriately stylized.

In accordance with examples of the present disclosure, a method for enlarging a style region of an image, and more specifically, an AgileGAN-based portrait stylization workflow, is described. In examples, after training a stylized generator using an AgileGAN method for example, a post-processing step may be included to enlarge the style region, thereby including hair regions, neck regions, headwear, and/or other accessories that may otherwise not be stylized. The method may include receiving an input image, generating a first stylized image, based on the input image, normalizing the input image, generating a second stylized image, based on the normalized input image, blending the first and second stylized images together to obtain a third stylized image that includes an enlarged style region, relative to the second stylized image, and providing the third stylized image as an output. At least one benefit of using such a method may include ensuring that the output stylized image is enlarged to include entire hair regions, neck regions, headwear, and/or other accessories.

FIG. 1 depicts an example of a dataflow process 100 for obtaining a generated image with a texture that is consistent with a style exemplar image, utilizing a latent code blending operation in accordance with examples of the present disclosure. In examples, during a first operation 102, one or more GAN generators 104 (such as a first GAN generator 104a and a second GAN generator 104b), and more specifically one or more AgileGAN generators, may be trained utilizing a plurality of images depicting a desired style.

A starting baseline for training the AgileGAN generators includes using a pre-trained GAN model (e.g., StyleGAN-based model and/or StyleGAN2 model). The pre-trained GAN model (e.g., StyleGAN-based model and/or StyleGAN2 model) exhibits the property that if random samples from a Gaussian distribution in the Z latent space are acquired, the model can generate images fitting the original training distribution, for example, the original training distribution of the dataset. Training the AgileGAN model may include two stages. The task of training involves using an image as input; therefore, a corresponding latent vector for the GAN model (e.g., StyleGAN-based model and/or StyleGAN2 model) model is determined. A front-end encoder, such as the hierarchical variational encoder, is trained to map input images (e.g., exemplar images 106) to latent spaces while keeping a back-end GAN generator fixed. In a second process, starting from a copy of the pre-trained GAN model (e.g., StyleGAN-based model and/or StyleGAN2 model), the pre-trained GAN model (e.g., StyleGAN-based model and/or StyleGAN2 model) is fine-tuned such that a sample from a Gaussian distribution in the latent space can generate images that better fit the stylistic exemplars.

In examples, the two training stages are executed independently and can be trained in parallel. However, structurally the two training stages share pivot latent spaces, and are also jointly anchored by the fixed GAN generator 104. By separating inversion training and image generation training into two stages as previously mentioned, the training of the AgileGAN model does not require paired datasets; thus, the separation of training also enables higher resolutions by reducing a computational load in making backpropagation process more effective and efficient. Rather than fine-tune the architecture of the AgileGAN model, new style domains can be incorporated by fine-tuning the generators.

Traditional autoencoders generally lack the ability to generate new images because the resulting latent space is discontinuous. To force the autoencoder utilized during a training of the GAN generator 104 to generate a continuous latent space, an output vector of means and an output vector of standard deviations are utilized. Training the hierarchical variational encoder includes optimizing for Kullback-Leibler divergence (e.g., a mean close to 0 and a standard deviation close to 1) in addition to image reconstruction and other losses which may rely on the means and standard deviations. The standard deviation and the mean may be sampled, generating the latent z vector corresponding to an input image of the plurality of input image. While a typical variational autoencoder includes an encoder $\epsilon\theta$ and a decoder $G\phi$ (e.g., the GAN generator 104) with respective parameters $\theta$ and $\phi$, which are trained jointly to minimize reconstruction error between input image x (e.g., an image of the plurality of training images 106) and output image x (e.g., an image generated by the GAN generator 104), the hVAE for inversion uses a fixed original pre-trained GAN model (e.g., StyleGAN-based model and/or StyleGAN2 model) as the decoder $G\phi o$ (e.g., GAN generator 418), and the hVAE is trained to learn the posterior distribution q(z|x).

Additional details for training the GAN generator 104 and a hierarchical variational autoencoder can be found in U.S. patent application Ser. No. 17/321,384, titled "A HIGH-RESOLUTION PORTRAIT STYLIZATION FRAMEWORKS USING A HIERARCHICAL VARIATIONAL ENCODER" and/or in U.S. patent application Ser. No. 17,534,631, titled "AGILEGAN-BASED REFINEMENT METHOD AND FRAMEWORK FOR CONSISTENT TEXTURE GENERATION" the contents of which are herein incorporated by reference for all that they teach and for all purposes.

During a second operation 108, an input image 110 may be insert into the first GAN generator 104a. The first GAN generator 104a may be an AgileGAN generator that is trained using methods discussed above. The first GAN generator 104a generates a first stylized image 114a, based on the input image 110.

Also during the second operation 108, the input image 110 may be normalized, such as, for example, by a normalizer engine or component 112. The normalizer component 112 may be trained or otherwise configured to crop and/or scale the input image 110. For example, the normalizer component 112 may align eye positions within a pre-specified region or at pre-specified dimensions to center the eye positions. Further, the normalizer component 112 may crop the input image 110 to a desired size, such as a square-sized image of dimensions, for example, 1024×1024. Additionally, or alternatively, the normalizer 112 may enlarge or reduce a size of the input image 110.

The input image 110, after being normalized by the normalizer component 112, may be input to the second GAN generator 104b. The second GAN generator 104b may be the same as the first GAN generator 104a (e.g., they are trained using the same or similar processes and data sets). Alternatively, the second GAN generator 104b may be different than the first GAN generator 104a (e.g., the second GAN generator 104b may be trained using a different training process and/or different data sets). The second GAN generator 104b generates a second stylized image 114b, based on the input image 110, after the input image 110 is normalized.

Each of the first and second stylized images 114a, 114b may be input into a respective extractor engine or component 116a, 116b. The extractor components 116a and/or 116b may each be trained or otherwise configured to extract a face parse mask or mask 118a, 118b from the corresponding first or second stylized images 114a, 114b. The masks 118a, 118b may correspond to one or more features of the respective first or second stylized images 114a, 114b that have been stylized. For example, each of the first or second stylized images 114a, 114b may include a corresponding hair region 120a, 120b and neck region 122a, 122b. The hair region 120b and/or the neck region 122b of the mask 118b may be smaller than the hair region 120a and/or the neck region 122a of the mask 118a. Accordingly, while the normalization component 112 may allow for a more accurate and/or detailed stylization of a face portion of the input image 110, the corresponding mask 118b may lack stylization of portions of the neck and/or hair, as shown in the neck region 122b and hair region 120b.

The extractor components 116 and/or 116b may be trained or otherwise configured to perform semantic image segmentation, wherein characteristics of a user's face are trained to be identified based on traditional landmarks (e.g., bone structure, contrast, expected location of characteristics, etc.). The extractor components 116 and/or 116b may include one or more machine learning models, such as neural networks, that are trained to with information of semantic facial regions at a pixel level of images.

The masks 118a and 118b corresponding to the first stylized image 114a and the second stylized image 114b, respectively, may be input into a selective blender engine or component 124 to generate a third stylized image 126. The third stylized image 126 may be obtained from blending the first and second stylized images 114a, 114b together, such as, for example, based on the first and second masks 120a, 120b. Specifically, the second stylized image 114b (e.g., a stylized region of the input image 110) may be enlarged, via the selective blender component 124 to include portions of the first stylized image 114a. The portions of the first stylized image 114a that are blended with the second stylized image 114b may be a portion of the hair region 120a and a portion of the neck region 122a of the corresponding mask 118a. As discussed earlier herein, the hair region 120a and the neck region 122a may be larger than the hair region 120b and the neck region 120b; therefore, blending portions of the first stylized image 114a that correspond to the hair region 120a and the neck region 122a will enlarge the stylized region of the second stylized image 114b.

The selective blender component 124 may blend the first stylized image 114a and the second stylized image 114b together to generate or otherwise obtain the third stylized image 126. The selective blender component 124 may perform gaussian blending, gaussian blurring, or gaussian smoothing to blend (e.g., convolve) the first stylized image 114a and the second stylized image 114b together. For example one or more boundaries of the first stylized image 114b may be defined along a top and a bottom of the mask 118b. A first set of pixels corresponding to the hair and neck regions 120a, 122a of the first stylized image 114a may be blended with a second set of pixels corresponding to a face region of the second stylized image 114b (e.g., between the neck region 122b and the hair region 120b). The first and second set of pixels may be blended (e.g., convolved) along the one or more boundaries of the first stylized image 114b.

Additional, or alternative methods for blending together images may be recognized by those of ordinary skill in the art.

It is contemplated that the hair regions 120a, 120b may include headwear or other accessories (e.g., necklaces, earrings, scarves, etc.), in accordance with some examples of the present disclosure. In such examples, the stylized region of the second stylized image 114 may be enlarged to include a stylized version of the headwear or other accessory, such as is shown in an example provided by FIG. 2, and further understood by those of ordinary skill in the art.

The third stylized image 126 may be provided as an output. For example, the third stylized image 126 may be provided as an output to a computing device, such as computing device 400 discussed later herein with respect to FIG. 4. After the third stylized image 126 is output, it may be displayed, such as on a display screen, or via a user interface. Additionally, or alternatively, the third stylized image may be output to be further processed in accordance with methods or systems known to those of ordinary skill in the art and/or learned from experimentation of systems and methods disclosed herein.

Generally, the selective blender component 124 allows for a stylized region of the second stylized image 114b to be enlarged, such that a hair and neck portion of an image are further and/or fully included in the stylization. Mechanisms disclosed herein are advantageous for generating enlarged stylization regions that includes component of an input image such as, hair, neck, headwear, etc.

Figure 2:
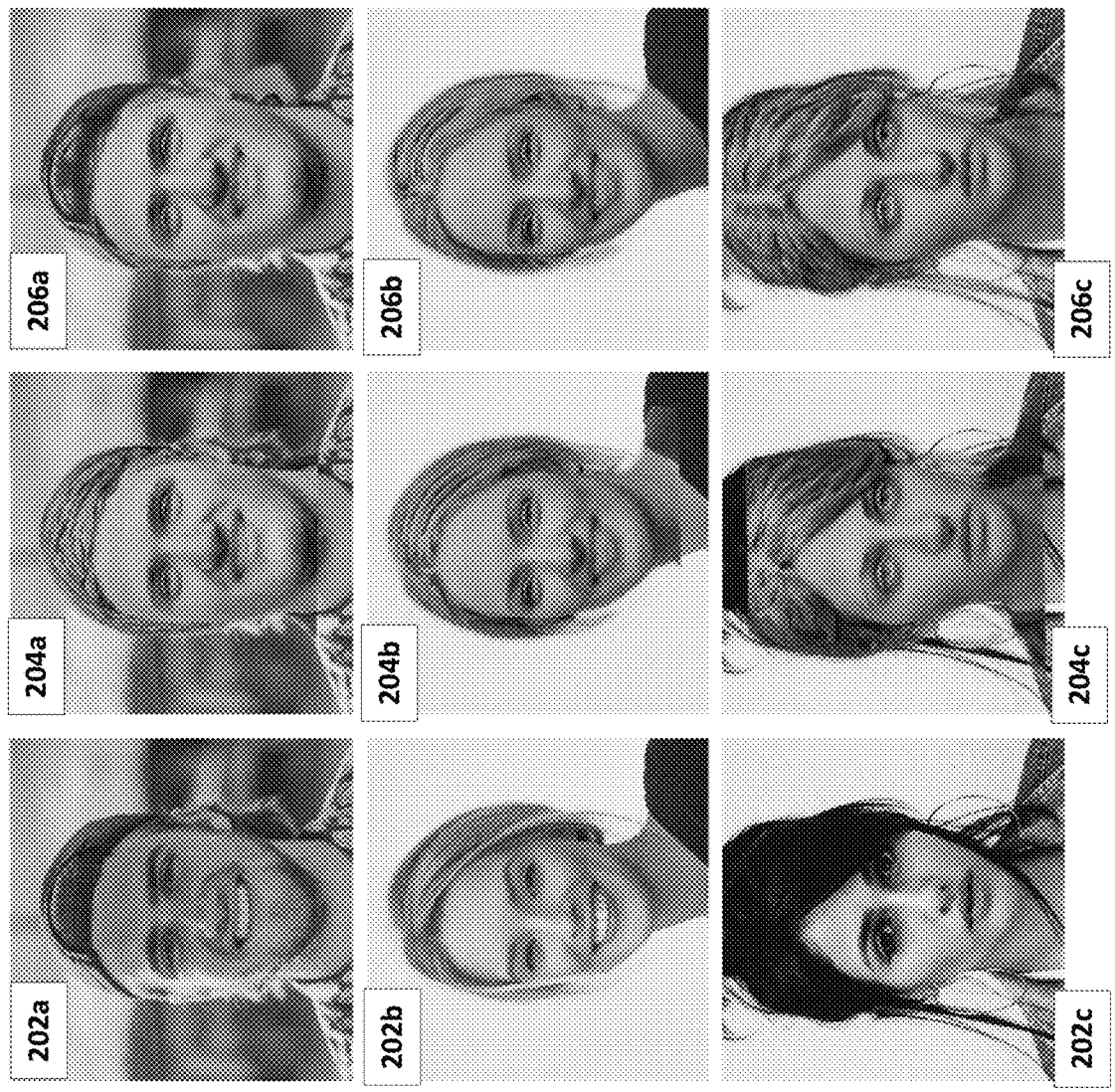
FIG. 2 illustrates examples of input images and corresponding stylized images along various parts of the dataflow process of FIG. 1.

FIG. 2 illustrates an example grid 200 of input images and corresponding stylized images along various parts of the dataflow process 100 of FIG. 1. The example grid 200 includes a first input image 202a, a second input image 202b, and a third input image 202c. The first, second, and third input images 202a, 202b, and 202c may be similar to the input image 110 described with respect to FIG. 1. For example, the first, second, and third input images 202a, 202b, and 202c may each have a hair region, a neck region, and a face region between the hair region and the neck region.

The first, second, and third input images 202a, 202b, and 202c may be normalized (e.g., via normalizer component 112) and insert into a GAN generator (e.g., GAN generator 104b). Subsequently, stylized regions may be generated for each of the input images 202a, 202b, and 202c. The example grid 200 includes the first input image 202a with a first stylized region 204a, the second input image 202b with a second stylized region 204b, and the third input image 202c with a third stylized region 204c.

As shown with respect to the images 202a, 202b, and 202c with stylized regions 204a, 204b, and 204c, the stylized regions 204a, 204b, and 204c do not fully extend across hair, neck, and headwear of the person in each of the respective input images 202a, 202b, and 202c. Referring specifically to the first input image 202a with the first stylized region 204a, a neck region of the person in the first input image 202a is not fully stylized. Further, headwear of the user is not fully stylized. Referring specifically to the second input image 202b with the second stylized region 204b, a neck region of the person in the second input image 202b is not fully stylized. Further, referring specially to the third input image 202c with the third stylized region 204c, a neck region and a hair region of the person in the third input image 202c is not fully stylized. Accordingly, there exists a need to enlarge the stylized regions 204a, 204b, and 204c of the input images 202a, 202b, and 202c.

The stylized regions 204a, 204b, and 204c may be enlarged or expanded via postprocessing according to mechanisms disclosed herein. For example, the input images 202a, 202b, and 202c may be input into, such as directly into without being normalized, a GAN generator (e.g., GAN generator 104a). Subsequently, a stylization region may be generated for each of the first, second, and third input images 202a, 202b, and 202c, as described with respect to FIG. 1. Further, the stylization regions may be blended (e.g., via the selective blender component 124) with the stylization regions 204a, 204, and 204c, respectively, to create enlarged stylized regions. For example, the example grid 200 includes the first input image 202a with a first enlarged stylized region 206a, the second input image 202b with a second enlarged stylized region 206b, and the third input image 202c with a third enlarged stylized region 206c. The first, second, and third enlarged stylized regions 206a, 206b, and 206c may be generated or otherwise obtained via selective blending between a first stylized region based on an input image, and a second stylized region based on an input image that was normalized.

As shown with respect to the images 202a, 202b, and 202c with enlarged stylized regions 206a, 206b, and 206c, the enlarged stylized regions 206a, 206b, and 206c fully extend across hair, neck, and headwear of the person in each of the respective input images 202a, 202b, and 202c. Referring specifically to the first input image 202a with the first stylized region 204a, a neck region of the person in the first input image 202a is fully stylized. Further, headwear of the user is fully stylized. Referring specifically to the second input image 202b with the second stylized region 204b, a neck region and hair region of the person in the second input image 202b is fully stylized. Further, referring specially to the third input image 202c with the third stylized region 204c, a neck region and a hair region of the person in the third input image 202c is fully stylized. Accordingly, mechanisms disclosed herein are beneficial for applying a postprocessing method that enlarges stylized regions to include entire neck regions, hair regions, headwear, and/or other accessories (e.g., necklaces, earrings, scarves, etc.) that are present in an input image.

Figure 3:
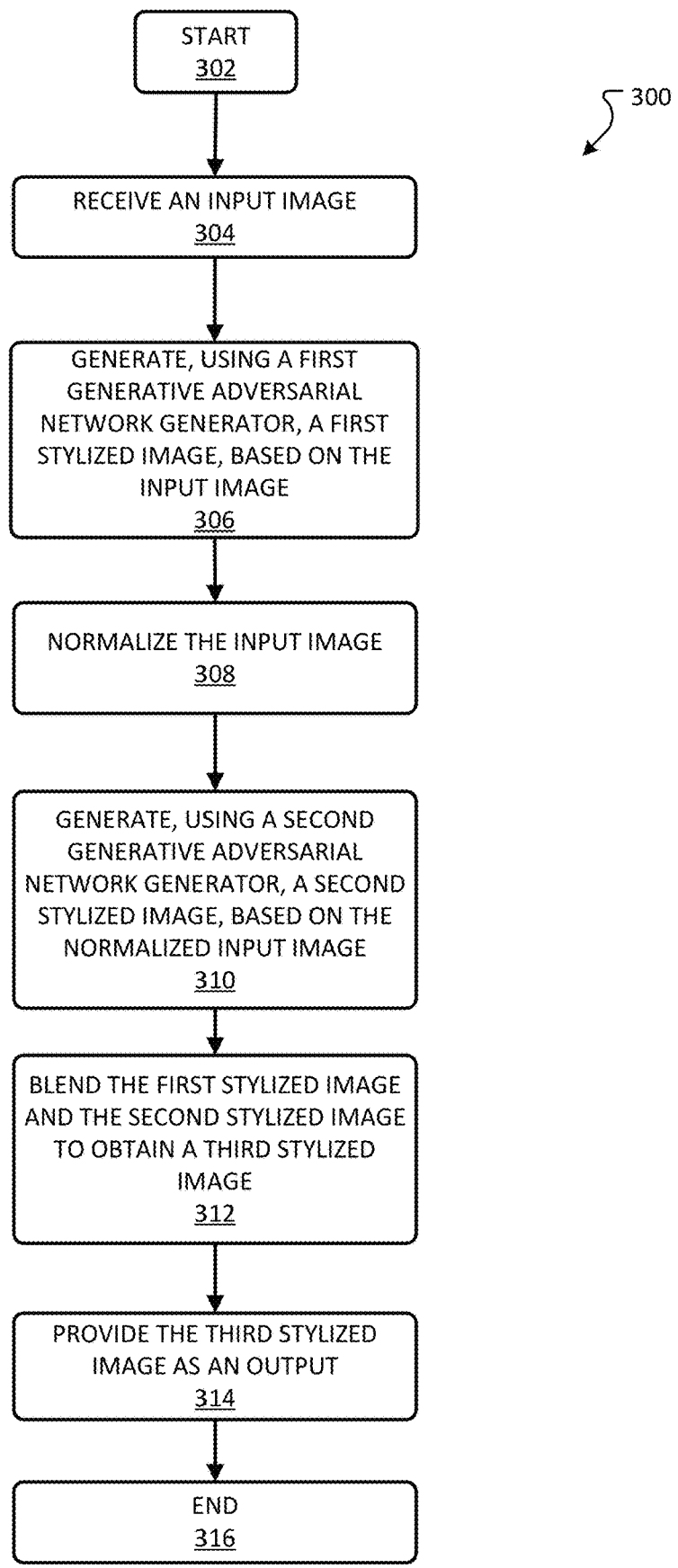
FIG. 3 illustrates details of an example method of enlarging a style region of an image in accordance with some examples of the present disclosure.

FIG. 3 depicts an exemplary method 300 for enlarging a style region of an image in accordance with some examples of the present disclosure. A general order for the steps of the method 300 is shown in FIG. 3. Generally, the method 300 starts at 302 and ends at 316. The method 300 may include more or fewer steps or may arrange the order of the steps differently than those shown in FIG. 3. The method 300 can be executed as a set of computer-executable instructions executed by a computer system and encoded or stored on a computer readable medium. In examples, aspects of the method 300 are performed by one or more processing devices, such as a computer or server. Further, the method 300 can be performed by gates or circuits associated with a processor, Application Specific Integrated Circuit (ASIC), a field programmable gate array (FPGA), a system on chip (SOC), a neural processing unit, or other hardware device. Hereinafter, the method 300 shall be explained with reference to the systems, components, modules, software, data structures, user interfaces, examples, etc. described in conjunction with FIGS. 1, 2, 4, and 5.

The method 300 starts at 302, where flow may proceed to 304. At 304, an input image may be received. For example, a user may provide an input image and/or a system may select an input image from a storage location. The input image may correspond to the input image 110 (FIG. 1) and/or the input images 202a, 202b, and/or 202c (FIG. 2).

The input image may be provided by a user. Additionally, or alternatively, the input image may be generated or otherwise obtained by a computing device (e.g., computing device 400). For example, a user may take an image with a camera of the computing device and an input image may be generated based visual data received by the camera.

Flow advances to 306, wherein a first stylized image is generated, based on the input image received at 304. The first stylized image may be generated using a first generative adversarial network generator (GAN), such as the first GAN 104a of FIG. 1. As described earlier herein, the first GAN may be an AgileGAN that is trained using a plurality of images depicting a desired style.

Flow advances to operation 308, wherein the input image is normalized (e.g., via the normalizer component 112 of FIG. 1). The normalization may include one or more of cropping or scaling the input image. For example, an image of a face may be cropped and/or scaled to center eyes of the face within a pre-determined region. Additionally, or alternatively, the scaling of the input image may include enlarging or shrinking the input image to match a predetermined format for input into a generative adversarial network generator.

Flow advances to operation 310, wherein a second stylized image is generated, based on the normalized input image. The second stylized image may be similar to one or more of the input images 202a, 202b, and 202c with stylized regions 204a, 204b, and 204c of FIG. 2. The second stylized image may be generated using a second generative adversarial network generator (GAN), such as the second GAN 104b of FIG. 1. As described earlier herein, the second GAN may be an AgileGAN that is trained using a plurality of images depicting a desired style. In some examples, the second GAN may be similar to or the same as the first GAN of operation 306. Alternatively, in some examples, the second GAN may be different than the first GAN of operation 306. For example, the second GAN may be trained using a different process and/or a different data set than that on which the first GAN was trained.

Flow advances to operation 312, wherein the first stylized image and the second stylized image are blended to obtain a third stylized image. The third stylized image may include an enlarged stylized region, relative to the second stylized region. The first and second stylized images may be blended using a selective blender, such as the selective blender component 124 of FIG. 1. The first and second stylized images may be blended via gaussian blending, gaussian blurring, or gaussian smoothing to blend (e.g., convolve) the first stylized image and the second stylized image together. For example one or more boundaries of the first stylized image may be defined along a top and a bottom of an extracted mask. A first set of pixels corresponding to the hair and neck regions of the first stylized image may be blended with a second set of pixels corresponding to a face region of the second stylized image (e.g., between the neck region and the hair region). The first and second set of pixels may be blended (e.g., convolved) along the one or more boundaries of the first stylized image. Additional, or alternative methods for blending together images may be recognized by those of ordinary skill in the art.

Flow advances to operation 314, wherein the third stylized image is provided as an output. For example, the third stylized image 126 may be provided as an output to a computing device, such as computing device 400 discussed later herein with respect to FIG. 4. After the third stylized image 126 is output, it may be displayed, such as on a display screen, or via a user interface. Additionally, or alternatively, the third stylized image may be output to be further processed in accordance with methods or systems known to those of ordinary skill in the art and/or learned from experimentation of systems and methods disclosed herein.

Generally, blending the first and second stylized images allows for a stylized region of the second stylized image to be enlarged, such that a hair portion, neck portion, and/or headwear or other accessories of an image are further and/or fully included in the stylization. Mechanisms disclosed herein are advantageous for generating enlarged stylization regions that includes component of an input image such as, hair, neck, headwear, accessories, etc.

The method 300 may then end at 316. Alternatively, the method 300 may return to operation 302, to create an iterative process of receiving input images and providing output images with enlarged style regions in accordance with aspects described herein.

Figure 4:
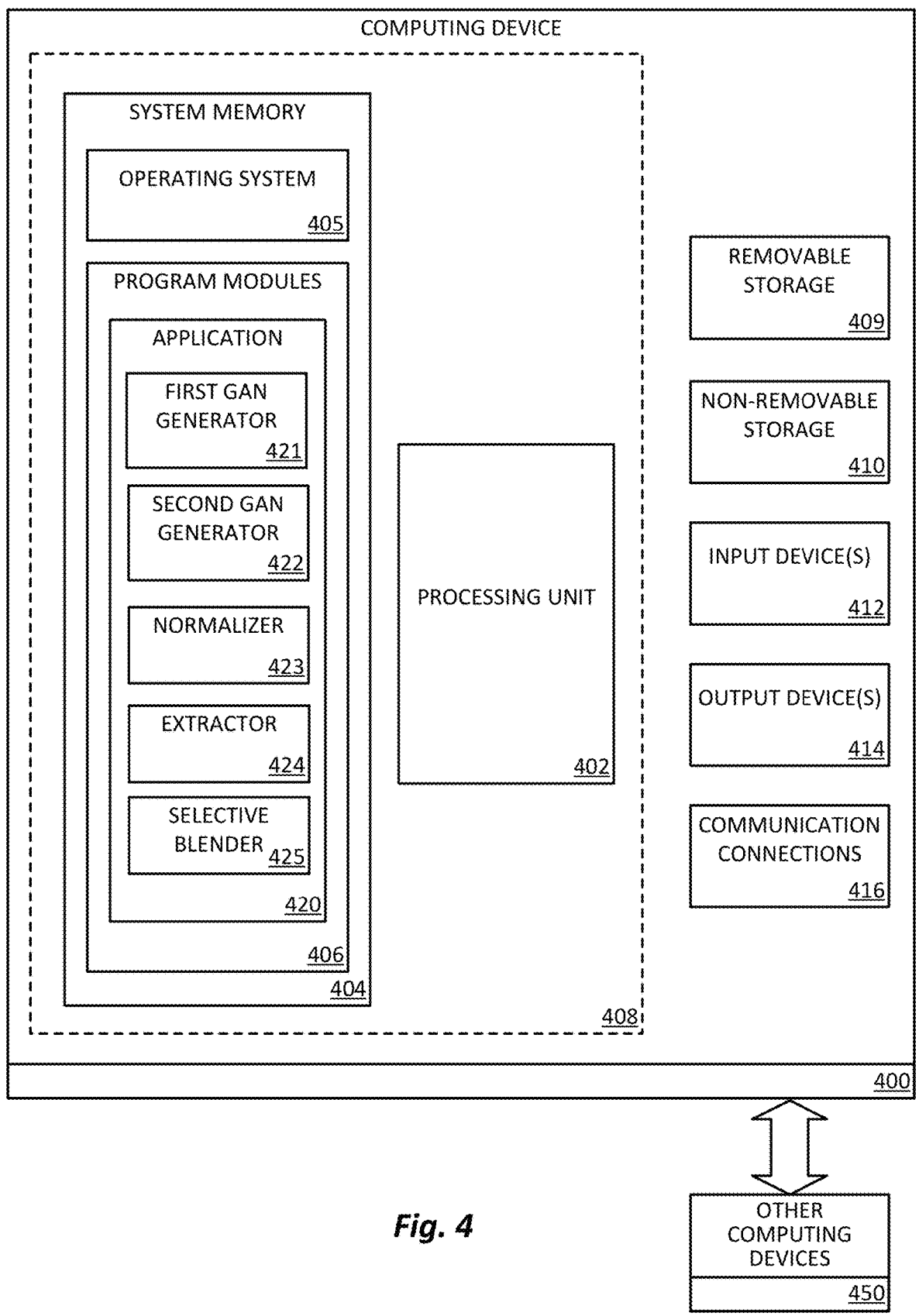
FIG. 4 is a block diagram illustrating physical components (e.g., hardware) of a computing system with which aspects of the disclosure may be practiced and in accordance with examples of the present disclosure.

FIG. 4 is a block diagram illustrating physical components (e.g., hardware) of a computing system 400 with which aspects of the disclosure may be practiced. The computing device components described below may be suitable for the computing and/or processing devices described above. In a basic configuration, the computing system 400 may include at least one processing unit 402 and a system memory 404. Depending on the configuration and type of computing device, the system memory 404 may comprise, but is not limited to, volatile storage (e.g., random-access memory (RAM)), non-volatile storage (e.g., read-only memory (ROM)), flash memory, or any combination of such memories.

The system memory 404 may include an operating system 405 and one or more program modules 406 suitable for running software application 420, such as one or more components supported by the systems described herein. As examples, system memory 404 may include a first GAN generator 421, a second GAN generator 422, a normalizer 423, an extractor 424, and a selective blender 425. The first and second GAN generators 421, 422 may be the same as or similar to the to the first and second GAN generators 104a, 104b (FIG. 1) and may refer to an AgileGAN generator as previously described. The normalizer 423 may be the same as or similar to the normalizer 112 (FIG. 1). The extractor 424 may be the same as or similar to the extractor 116a and/or 116b (FIG. 1). The selective blender 425 may be the same as or similar to the selective blender 124 (FIG. 1). The operating system 405, for example, may be suitable for controlling the operation of the computing system 400.

Furthermore, examples of the present disclosure may be practiced in conjunction with a graphics library, other operating systems, or any other application program and is not limited to any particular application or system. This basic configuration is illustrated in FIG. 4 by those components within a dashed line 408. The computing system 400 may have additional features or functionality. For example, the computing system 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., software applications 420) may perform processes including, but not limited to, the aspects, as described herein. Other program modules may be used in accordance with aspects of the present disclosure. Furthermore, examples of the disclosure may be practiced in an electrical circuit discrete electronic element, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 400 may also have one or more input device(s) 412 such as a keyboard, a mouse, a pen, a sound or voice input device, a touch or swipe input device, etc. The one or more input device 412 may include an image sensor. The output device(s) 414 such as a display, speakers, a printer, etc. may also be included. The aforementioned devices are examples and others may be used. The computing system 400 may include one or more communication connections 416 allowing communications with other computing devices/systems 450 as shown in FIG. 4. Examples of suitable communication connections 416 include, but are not limited to, radio frequency (RF) transmitter, receiver, and/or transceiver circuitry; universal serial bus (USB), parallel, and/or serial ports. The computing system 400 may represent one or more computing systems on which the dataflow process 100 and/or the method 300 are implemented.

The term computer readable media as used herein may include computer storage media. Computer storage media may include volatile and nonvolatile, removable, and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing system 400. Any such computer storage media may be part of the computing system 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5:
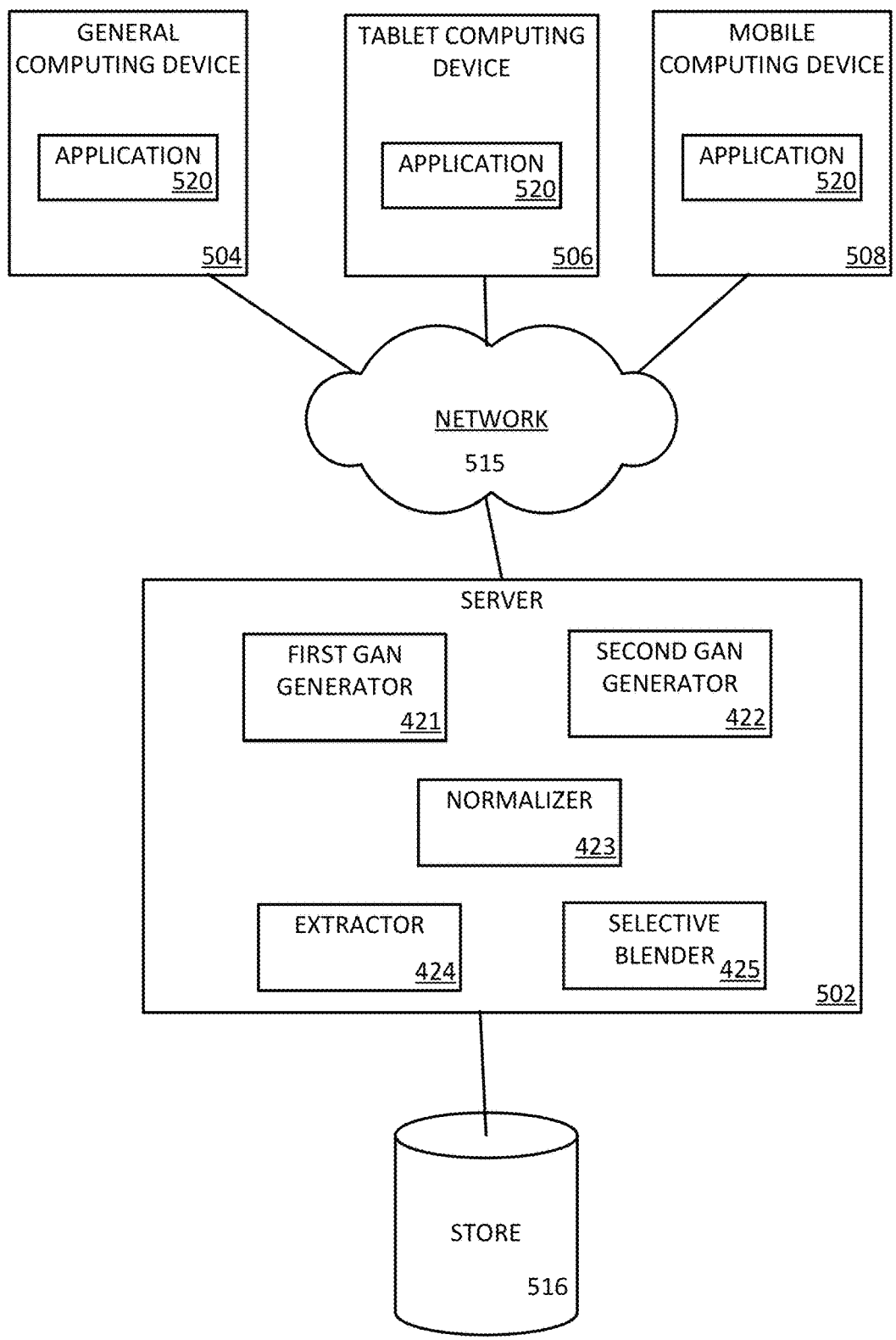
FIG. 5 illustrates one aspect of the architecture of a system for processing data received at a computing system from a remote source in accordance with examples of the present disclosure.

FIG. 5 illustrates one aspect of the architecture of a system for processing data received at a computing system from a remote source, such as a personal computer 504, tablet computing device 506, or mobile computing device 508. The personal computer 504, tablet computing device 506, or mobile computing device 508 may include one or more applications 520; such applications may include but are not limited to the first GAN generator 421, the second GAN generator 422, the normalizer 423, the extractor 424, and the selective blender 425. Content at a server device 502 may be stored in different communication channels or other storage types. For example, various documents may be stored using a directory service, a web portal, a stylized image service, an instant messaging store, or social networking services.

One or more of the previously described program modules 406 or software applications 420 may be employed by the server device 502 and/or the personal computer 504, tablet computing device 506, or mobile computing device 508, as described above. For example, the server device 502 may include the first GAN generator 421, the second GAN generator 422, the normalizer 423, the extractor 424, and the selective blender 425 previously described.

The server device 502 may provide data to and from a client computing device such as a personal computer 504, a tablet computing device 506 and/or a mobile computing device 508 (e.g., a smart phone) through a network 515. By way of example, the computer system described above may be embodied in a personal computer 504, a tablet computing device 506 and/or a mobile computing device 508 (e.g., a smart phone). Any of these examples of the computing devices may obtain content from the store 516, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for enlarging a style region of an image, the method comprising:
   receiving an input image;
   generating, using a first generative adversarial network (GAN) generator, a first stylized image, based on the input image;
   normalizing the input image;
   generating, using a second generative adversarial network (GAN) generator, a second stylized image, based on the normalized input image;
   extracting a first face parse mask from the first stylized image, wherein the first face parse mask includes one or more stylized features of the first stylized image;
   extracting a second face parse mask from the second stylized image, wherein the second face parse mask includes one or more stylized features of the second stylized image;
   blending the first stylized image and the second stylized image to obtain a third stylized image, wherein the blending of the first stylized image and the second stylized image is based on the first and second face parse masks; and
   providing the third stylized image as an output.

2. The method of claim 1, wherein the blending of the first stylized image and the second stylized image comprises gaussian blending.

3. The method of claim 2, wherein the third stylized image comprises a first set of pixels corresponding to hair and necks regions of the first stylized image, and a second set of pixels corresponding to the face region of the second stylized image.

4. The method of claim 1, wherein the normalizing comprises one or more of cropping or scaling the input image.

5. The method of claim 1, wherein the first GAN generator is different than the second GAN generator.

6. The method of claim 1, wherein the first GAN generator and the second GAN generator are AgileGAN generators.

7. The method of claim 1, further comprising:
   receiving a plurality of exemplar stylistic images; and
   training the first and second GAN generators using transfer learning based on the received plurality of exemplar stylistic images.

8. A system, comprising:
   at least one processor;
   memory storing instructions that, when executed by the at least one processor, causes the system to perform a set of operations, the set of operations including:
   receiving an input image;
   generating, using a first generative adversarial network (GAN) generator, a first stylized image, based on the input image;
   normalizing the input image;
   generating, using a second generative adversarial network (GAN) generator, a second stylized image, based on the normalized input image;
   extracting a first face parse mask from the first stylized image, wherein the first face parse mask includes one or more stylized features of the first stylized image;
   extracting a second face parse mask from the second stylized image, wherein the second face parse mask includes one or more stylized features of the second stylized image;
   blending the first stylized image and the second stylized image to obtain a third stylized image, wherein the blending of the first stylized image and the second stylized image is based on the first and second face parse masks; and
   providing the third stylized image as an output.

9. The system of claim 8, wherein the blending of the first stylized image and the second stylized image comprises gaussian blending.

10. The system of claim 8, wherein the third stylized image comprises a first set of pixels corresponding to hair and necks regions of the first stylized image, and a second set of pixels corresponding to the face region of the second stylized image.

11. The system of claim 8, wherein the normalizing comprises one or more of cropping or scaling the input image.

12. The system of claim 8, wherein the first GAN generator is different than the second GAN generator.

13. The system of claim 8, wherein the first GAN generator and the second GAN generator are AgileGAN generators.

14. The system of claim 8, wherein the set of operations further include:
   receiving a plurality of exemplar stylistic images; and training the first and second GAN generators using transfer learning based on the received plurality of exemplar stylistic images.

15. A non-transitory computer-readable storage medium comprising instructions being executable by one or more processors to cause the one or more processors to:
receive an input image;
generate, using a first generative adversarial network (GAN) generator, a first stylized image, based on the input image;
normalize the input image;
generate, using a second generative adversarial network (GAN) generator, a second stylized image, based on the normalized input image;
extract a first face parse mask from the first stylized image, wherein the first face parse mask includes one or more stylized features of the first stylized image;
extract a second face parse mask from the second stylized image, wherein the second face parse mask includes one or more stylized features of the second stylized image;
blend the first stylized image and the second stylized image to obtain a third stylized image, wherein the blending of the first stylized image and the second stylized image is based on the first and second face parse masks; and
provide the third stylized image as an output.

16. The non-transitory computer-readable storage medium of claim 15, wherein the instructions further cause the one or more processors to:
receive a plurality of exemplar stylistic images; and
train the first and second GAN generators using transfer learning based on the received plurality of exemplar stylistic images.

17. The non-transitory computer-readable storage medium of claim 15, wherein the third stylized image comprises a first set of pixels corresponding to hair and necks regions of the first stylized image, and a second set of pixels corresponding to the face region of the second stylized image.

* * * * *